(12) United States Patent
Brunsch et al.

(10) Patent No.: US 6,232,769 B1
(45) Date of Patent: May 15, 2001

(54) MODULAR WAVEGUIDE ASSEMBLY FOR A POSITION SENSOR AND METHOD FOR MAKING THE SAME

(75) Inventors: Arwed Brunsch, Stuttgart; Ernst Ehling, Neuhausen; Martin Kurz, Kreis Esslinger; Jürgen Petrik, Stuttgart, all of (DE)

(73) Assignee: Balluff, Inc., Florence, KY (US)

(*) Notice: Subject to any disclaimer, the term of this patent is extended or adjusted under 35 U.S.C. 154(b) by 0 days.

(21) Appl. No.: 09/097,693

(22) Filed: Jun. 16, 1998

(51) Int. Cl.[7] .................................................. G01B 7/14

(52) U.S. Cl. ................................ 324/207.13; 324/207.24; 73/290 V; 73/313

(58) Field of Search .......................... 324/207.13, 207.12, 324/207.22; 310/26; 73/290 V, 32 A; 333/148; 367/140; 29/290

(56) References Cited

U.S. PATENT DOCUMENTS

| 3,633,424 | 1/1972 | Lynnworth et al. ............... 73/339 A |
| 3,898,555 | 8/1975 | Tellerman . |

(List continued on next page.)

FOREIGN PATENT DOCUMENTS 0149745    7/1985    (EP).

OTHER PUBLICATIONS

Patriot Sensors & Controls Corporation: "Thanks for the Memories . . . It's Time for Something Better—The GEMCO LPS"; 4 pages.

Patriots Sensors & Controls Corporation; "Gemco Series 951 QUIK–STIK II Linear Displacement Transducer"; 4 pages.

Balluff Inc.; "Sensors Transducers ID Systems (Edition E)"; pp. i, H1–H39, H65–H72.

Baluff Inc., *Absolute Linear Position Sensor BTL3 Rod Style—Synchronous Serial Data Transmission,* Apr. 1995.

(List continued on next page.)

*Primary Examiner*—Christine Oda
*Assistant Examiner*—Subhash Zaveri
(74) *Attorney, Agent, or Firm*—Dinsmore & Shohl LLP

(57) ABSTRACT

A modular waveguide assembly for use in a position sensor promotes efficient manufacturing, and can be tested and handled separately from the electronics module of the sensor. The waveguide assembly includes a channel having an opening extending along its length, a waveguide located within the channel, a conductor located within the channel, and a mode converter, such as a coil, located within the channel and positioned to generate an electrical signal from a signal traveling along the waveguide. A damping material can be inserted into the channel opening and around a portion of the waveguide such that the material adheres to the waveguide. In one embodiment, the damping material is at least initially partially flowable, and is then cured. A support sleeve for locating the waveguide can also be included in the assembly, and includes an elongated tubular member comprising an integral piece of flexible material and a plurality of constrictions spaced along its length for locating the waveguide and protecting it from shock and vibration. The assembly can also include a support element for connecting the coil to the electronics module of the sensor. The element can include terminals electrically connected to the coil ends and a bore for receiving the waveguide and conductor. In addition, the waveguide assembly can be pre-calibrated for use with any electronics module by connecting a gain unit, such as a resistor, to the assembly. The gain unit is selected according to the characteristics of the waveguide, such as its length and/or magnetostrictive sensitivity, and can be easily connected to the electronics module for control of the amplification circuitry in the module.

29 Claims, 7 Drawing Sheets

U.S. PATENT DOCUMENTS

| | | |
|---|---|---|
| 3,906,435 | 9/1975 | Lamel et al. . |
| 4,425,115 | 1/1984 | Wuchinich ............... 604/22 |
| 4,845,450 | 7/1989 | Porzio et al. . |
| 4,943,773 | 7/1990 | Koski et al. . |
| 4,952,873 | 8/1990 | Tellerman ............ 324/207.13 |
| 4,958,332 | 9/1990 | Tellerman ............... 367/140 |
| 5,253,522 | 10/1993 | Nyce et al. . |
| 5,313,160 | 5/1994 | Gloden et al. . |
| 5,473,245 | 12/1995 | Silvus, Jr. et al. . |
| 5,535,625 | 7/1996 | Levy . |
| 5,545,984 | 8/1996 | Gloden et al. ............ 324/207.13 |
| 5,590,091 | 12/1996 | Gloden et al. . |
| 5,640,109 | 6/1997 | Nyce . |
| 5,680,041 | 10/1997 | Begin ............... 324/207.13 |
| 5,821,743 | 10/1998 | Page, Jr. et al. ........ 324/207.13 |

OTHER PUBLICATIONS

Balluff Inc., *Linear Position Transducers*, pp. 2–5, Apr. 1997.

Balluff Inc., BTL *Linear Displacement Transducer Analog Series A, B, C, E Digital and Series P.* Catalog No. 507 E, Edition 9001, pp. 1–23, Jan. 1990.

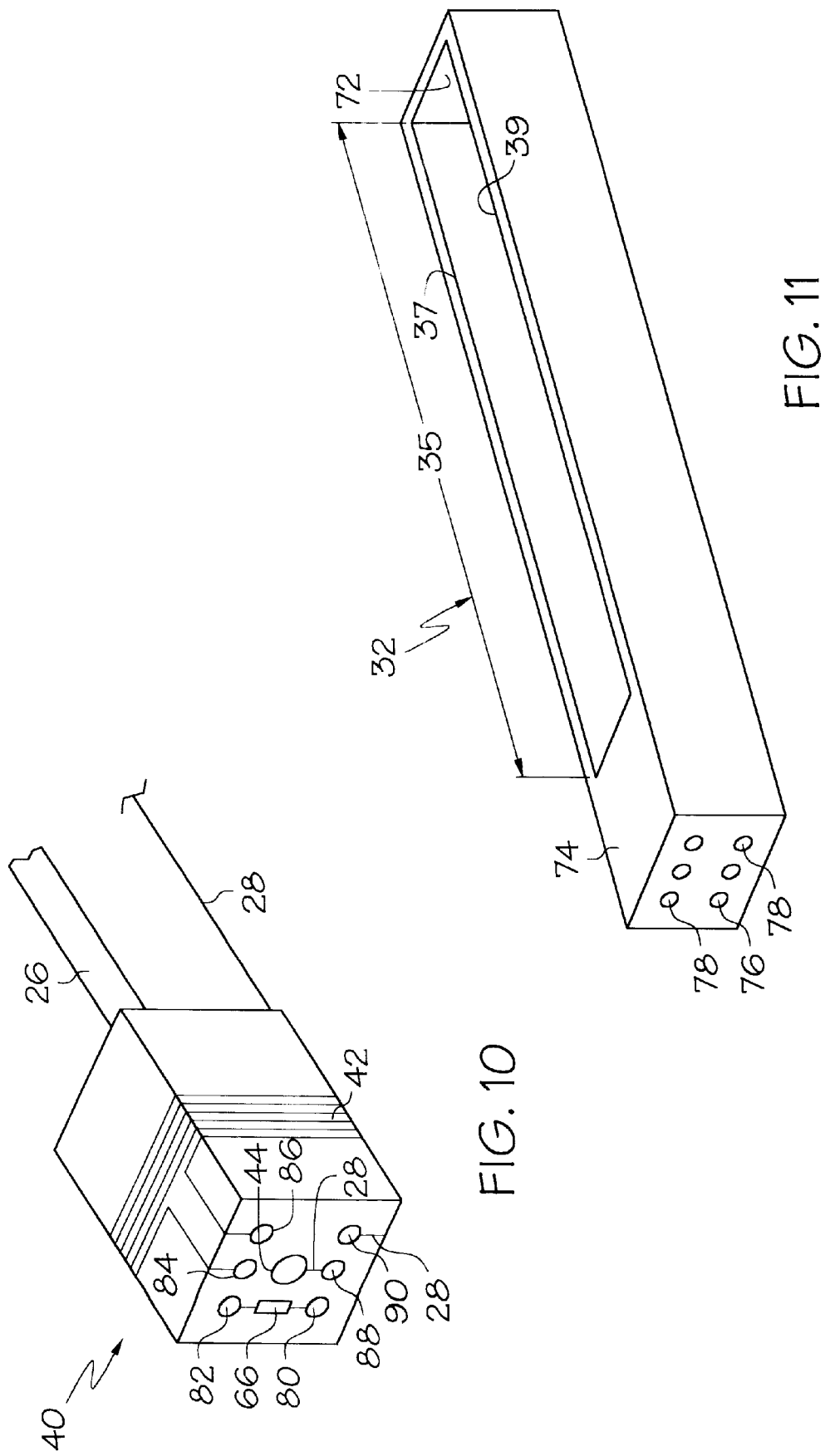

MODULAR WAVEGUIDE ASSEMBLY FOR A POSITION SENSOR AND METHOD FOR MAKING THE SAME

TECHNICAL FIELD

This invention relates to a modular waveguide assembly for a position measurement system, and, more specifically, in a preferred embodiment, to a mechanical modular waveguide assembly having an open channel for receiving and holding the waveguide, an integral tube fitted within the channel and having constrictions for locating the waveguide, a damping material which is injected into the channel and around at least a portion of the waveguide, a spool fitted within one end of the channel for holding a coil and the wires associated with the waveguide, and a flexible cable connector attached to pins on the spool for ease in connection to an electronics assembly.

BACKGROUND OF THE INVENTION

A magnetostrictive linear position measurement system typically includes a magnetostrictive waveguide wire which is housed in a protective tubular housing about which a magnet is slidingly engaged. A current pulse can be sent through a wire near the waveguide, and this pulse interacts with a circular magnetic field of the magnet to induce a torsional strain wave in the magnetostrictive waveguide at the location of the magnet. The ability of a material to deform in the presence of a magnetic field is known as magnetostriction. The strain wave travels along the length of the waveguide and passes through a coil which converts the mechanical wave into an electrical signal. To obtain the location of the magnet, the time between the transmission of the current pulse and the reception of the signal from the coil can be measured and converted to a distance, because the speed at which the torsional wave will travel along the waveguide is known. Accordingly, when the magnet is connected to a movable mass, such as a liquid level quantity or a movable element in a machine tool for example, the exact position of the mass can be measured.

Damping elements can be secured to the end of the waveguide in order to prevent the strain wave from being reflected back along the waveguide and interfering with ongoing measurements. Typically, such damping elements have been provided in the form of round rubber discs which can be compressively arranged on the waveguide wire. Also, a sleeve can be provided for supporting and centering the waveguide. One such sleeve available from Balluff Inc. includes a plurality of rigid interlocking tubular pieces having a plurality of rubber rings inserted therein for centering the waveguide. In addition, an electronics module is typically connected to the coil for controlling the transmission of the current pulse and obtaining the position measurement by timing the signal received from the coil.

A number of disadvantages have been encountered with conventional magnetostrictive position sensors. For example, the assembly of such a sensor often requires a significant amount of manual labor such as, for example, the labor required in mounting and locating the damping discs onto the waveguide, or the labor required in fitting together the various pieces and rings of the support sleeve. In addition, conventional sensors have provided no separate mounting member for the entire waveguide assembly (which includes the pulse wire, damping elements, coil, and other components), such that this complete assembly could be handled and tested separately from the final product, and prior to being assembled with the electronics module and protective housing with which it will be used. In other words, heretofore no means was provided for handling, transporting, and stocking the waveguide assembly separate from the electronics module so that the waveguide assembly could be preassembled, pre-tested, and ready for connection to a customized electronics unit and housing assembly. In contrast, conventional sensors have required delicate handling of the components until the complete unit was constructed.

Moreover, no capability was previously provided for maintaining a number of preassembled waveguide assemblies and a number of preassembled electronic assemblies on hand, and then easily connecting any such waveguide assembly with any electronics assembly to be used upon demand by the customer. Furthermore, the delicate wires of the coil and the pulse wire were not conveniently held in one fixed location for simple and efficient interchangeability with the electronics unit.

U.S. Pat. No. 4,958,332, issued to Tellerman, discloses a damping device 30 for the remote end of a waveguide wire, which includes a tubular housing and a remote housing section 34. The remote end of the waveguide 22 is held within the damping device 30 by anchor 40 and the rest of the waveguide extends from the device. Spacers 46 and 47 are provided at the opposite ends of the chamber 45 of the device 30. The spacer 47 is preferably of a soft rubber to reduce front-end reflections. The chamber 45 of the device 30 is filled with a viscous liquid damping material. The waveguide 22, along with the damping device 30 which surrounds its remote end, fits within an outer protective tube 20 which connects to a housing 12 having a mode converter. A plug 14 provides an output indicating the spacing of the magnet 17 from the mode converter in the housing 12.

U.S. Pat. No. 5,545,984, issued to Gloden et al., discloses a waveguide 4 which is partially enclosed in a suspension sleeve 2. Damping element 6 is slipped over the waveguide 4 and is generally cylindrical in shape as is the suspension sleeve 2. The waveguide 4, suspension sleeve 2, and damping element 6 reside in an enclosure tube 3 which is mechanically supported at one end by a housing 17 through an end flange 19. A suitable mode converter (not shown) provides an electrical signal to an electronic circuit 26.

Generally, however, previously available magnetostrictive linear position sensors suffer from one or more of the above-mentioned problems, including difficulty in assembly, inability to easily handle and test the waveguide assembly separate from the electronics assembly and protective housing, inability to maintain a preassembled stock of waveguide assemblies which can be quickly and easily connected to a customized electronics assembly and support housing, and/or inability to quickly and easily connect any electronics assembly with a waveguide assembly of any length Accordingly, an apparatus and method which avoids these problems would be desirable.

SUMMARY OF THE INVENTION

Accordingly, it is an object of the present invention to obviate the above-described problems.

It is another object of the present invention to provide a modular waveguide assembly which can be easily assembled.

Yet another object of the present invention is to provide a modular waveguide assembly which lends itself to automated assembly.

It is another object of the present invention to provide a modular waveguide assembly which can be preassembled, tested, and stocked separately from the electronics assembly, and housing with which it will eventually be used.

It is also an object of the present invention to provide a modular waveguide which can be preassembled, tested and inventoried, for later custom matching with a desired electronics assembly as needed for a particular application.

Another object of the invention is to provide a waveguide assembly which can be readily connected to a customized electronics unit and housing unit.

It is another object of the present invention to provide a waveguide assembly which can be quickly and easily connected to an electronics unit.

Yet another object of the invention is to provide a waveguide assembly which is relatively low in cost, requires relatively few pieces, and is relatively simple to assemble.

Additional objects and advantages of the invention will be set forth in part in the description that follows.

To achieve the foregoing and other objects, and in accordance with the purposes of the present invention as described above, there is provided a waveguide assembly for use in a position sensor having a protective outer housing to surround the waveguide assembly, a magnet mounted for movement along the protective housing, and an electronics module which receives an electrical signal from the waveguide assembly and provides an output representing the position of the magnet. The waveguide assembly can comprise an elongated channel, an elongated waveguide located at least partially within the channel, a conductor located at least partially within the channel, and a mode converter connected to the channel. The elongated channel has an opening extending along at least a portion of its length, and the mode converter is adapted to generate an electrical signal from a signal traveling along the waveguide.

Preferably, the mode converter of the waveguide assembly comprises a coil which is wound about a support element and has two ends which are secured at the support element. In this preferred embodiment, the support element is at least partially received within the channel and the waveguide is received within a bore in the support element. In another aspect of the invention, the support element comprises a base portion, a coil mounted to the base portion, and first, second, third, and fourth terminals connected to the base portion. The first terminal connects to a first end of the coil and the second terminal connects to a second end of the coil. Preferably, the base portion is in the form of a spool and includes a recessed portion about which the coil is wound.

It is also preferred that the waveguide assembly includes a support sleeve located at least partially within the channel and surrounding at least a portion of the waveguide. The support sleeve preferably includes constrictions spaced at irregular intervals along its length. In another aspect of the invention, the support sleeve comprises an elongated tubular member configured to receive a waveguide and having oppositely disposed openings at its ends. The tubular member can comprise an integral piece of flexible material, and a plurality of constrictions spaced along its length. The effective inner diameter of the tubular member is smaller at the constrictions than at the other portions of the member.

It is also preferred that the waveguide assembly includes a partially flowable material which is located within the channel in contact with a portion of the waveguide. Preferably, the damping material comprise a silicone material. In another aspect of the invention, a method of assembling the waveguide assembly is provided. A waveguide is inserted into a channel having an opening extending along a substantial portion of its length. A damping material is inserted into the opening and around at least a portion of the waveguide such that the damping material adheres to a portion of the waveguide. It is preferred that the damping material comprises an at least initially partially flowable material and that the damping material is cured after being inserted into the channel.

The waveguide assembly also preferably includes a gain unit connected to the channel and having at least one terminal adapted to connect to the electronics module. In another aspect of the invention, a pre-calibrated waveguide assembly is provided comprising a mounting member, a waveguide at least partially received within the mounting member, and a gain unit connected to the mounting member. The gain unit includes at least one terminal adapted to connect to the electronics module of a position sensor, and is selected according to the length of the waveguide to control the amplification of an electrical signal to be processed by the electronics module. Preferably, the gain unit comprises a resistor connected to a support element, and the mounting member comprises a channel to which the support element is mounted.

Still other aspects of the present invention will become apparent to those skilled in this art from the following description wherein there is shown and described a preferred embodiment of this invention, simply by way of illustration, of a best mode contemplated for carrying out the invention. As will be realized, the invention is capable of other different aspects and embodiments without departing from the scope of the invention. Accordingly, the drawings and descriptions should be regarded as illustrative in nature and not as restrictive in nature.

BRIEF DESCRIPTION OF THE DRAWINGS

While the specification concludes with claims particularly pointing out and distinctly claiming the invention, it is believed the same will be better understood from the following description taken in connection with the accompanying drawings in which:

FIG. 10 is a side perspective view of an alternative embodiment of the support element according to the present invention; and FIG. 11 is a side perspective view of an alternative embodiment of a channel according to the present invention.

DETAILED DESCRIPTION OF THE PREFERRED EMBODIMENTS

Figure 1:
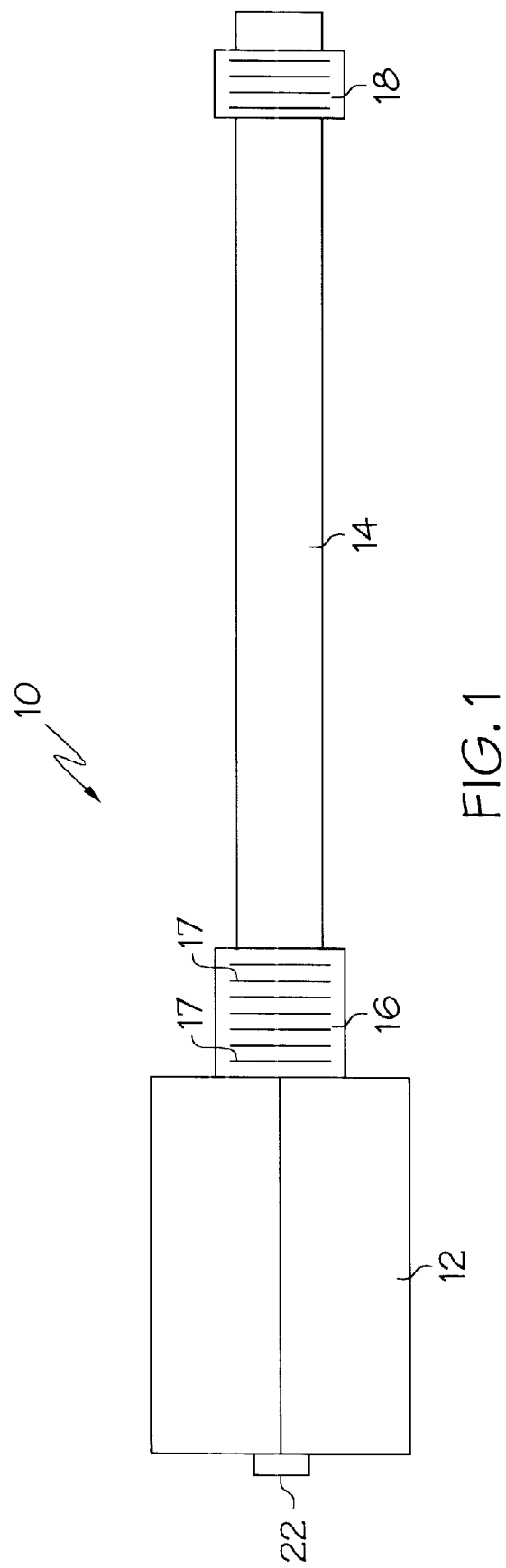
FIG. 1 is a side view of an exemplary complete magnetostrictive lineal displacement sensor made in accordance with the present invention, illustrated in an application where a movable part of a device is connected to the sensor via a control arm.

Referring now to the drawings in detail, wherein like numerals indicate the same elements throughout the views, FIG. 1 illustrates a magnetostrictive linear position sensor which includes an electronics housing 12, an attachment flange 16, a waveguide housing 14, and a magnet assembly 18. For protection, the waveguide assembly, described in further detail below, resides in the stainless steel housing 14 and flange 16. The stainless steel housing 14 is connected and secured to the steel mounting flange 16, and the flange is illustrated as preferably including external threads 17 for threadably engaging the sensor 10 to a machine or apparatus in which it will be used. The electronics housing 12 is preferably made of an extruded aluminum and is connected and secured to the flange 16. Within the housing 12 resides the electronics and circuitry for processing the signal generated by the waveguide assembly contained within the housing 14 and flange 16. As will be explained, the electronics and circuitry are electrically connected to the coil and pulse wire of the waveguide assembly and are adapted to calculate the magnet position 18 from the signal received from coil. While particular materials have been described for construction of the electronics housing 12, flange 16, and waveguide housing 14, it is contemplated that other protective materials could equally be used as well, such as, for example, fiberglass, plastics, aluminum, and/or composites.

The magnet assembly 18 can be in the form of a plastic or aluminum ring which surrounds the waveguide assembly 14. However, the magnet assembly 18 need not completely surround the housing 14, but, rather, can move along one of the sides of the housing, such as the top side of the housing. Disposed within and around the magnet assembly 18 are a number of magnets (not shown) which provide a magnetic field for interacting with a current pulse and producing a strain wave in a waveguide. For example, four magnets could be spaced about the assembly 18. The magnet or magnets could be housed inside of a set screw or other magnet holder, such as, for example, a stainless steel float.

The magnet connects to the movable element, part, or fluid whose position is desired to be measured, such as by screws or a snap ring for example. Other connections could also be made between the magnet 18 and the element. For example the magnet could connect with a control arm such as by a ball joint connection, swivel eye connection, or pinned connection, for example. As the movable element moves along its axis, the magnet assembly 18 is forced to be correspondingly moved along the waveguide housing 14 by the movable element. Accordingly, sensing the position of the magnet assembly 18 is equivalent to sensing the actual position of the movable element, as described in further detail below.

A connector 22 is used to supply power to the sensor 10 and to interchange input and output signals between the sensor 10 and the control circuitry and devices with which it is used. The supply voltage could comprise, for example, a 24 volt DC input signal. The output signal of the sensor 10 represents the position of the magnet along the waveguide housing 14 (and, therefore, the position of the movable element), and can be provided in a number of forms as desired, such as, for example a 0–10 volt DC signal.

The length of the waveguide and its housing 14 depends upon the application in which it will be used. Typically, this length can range from around 2 inches to over 140 inches. However, it is contemplated that other configurations and lengths for the sensor 10 than those described above can be utilized without departing from the scope of the invention.

Preferably, the housings 12 and 14, and flange 16 are adequately sealed such that moisture and fluids external to the sensor 10 cannot easily reach the waveguide assembly or electronics housed therein.

Figure 2:
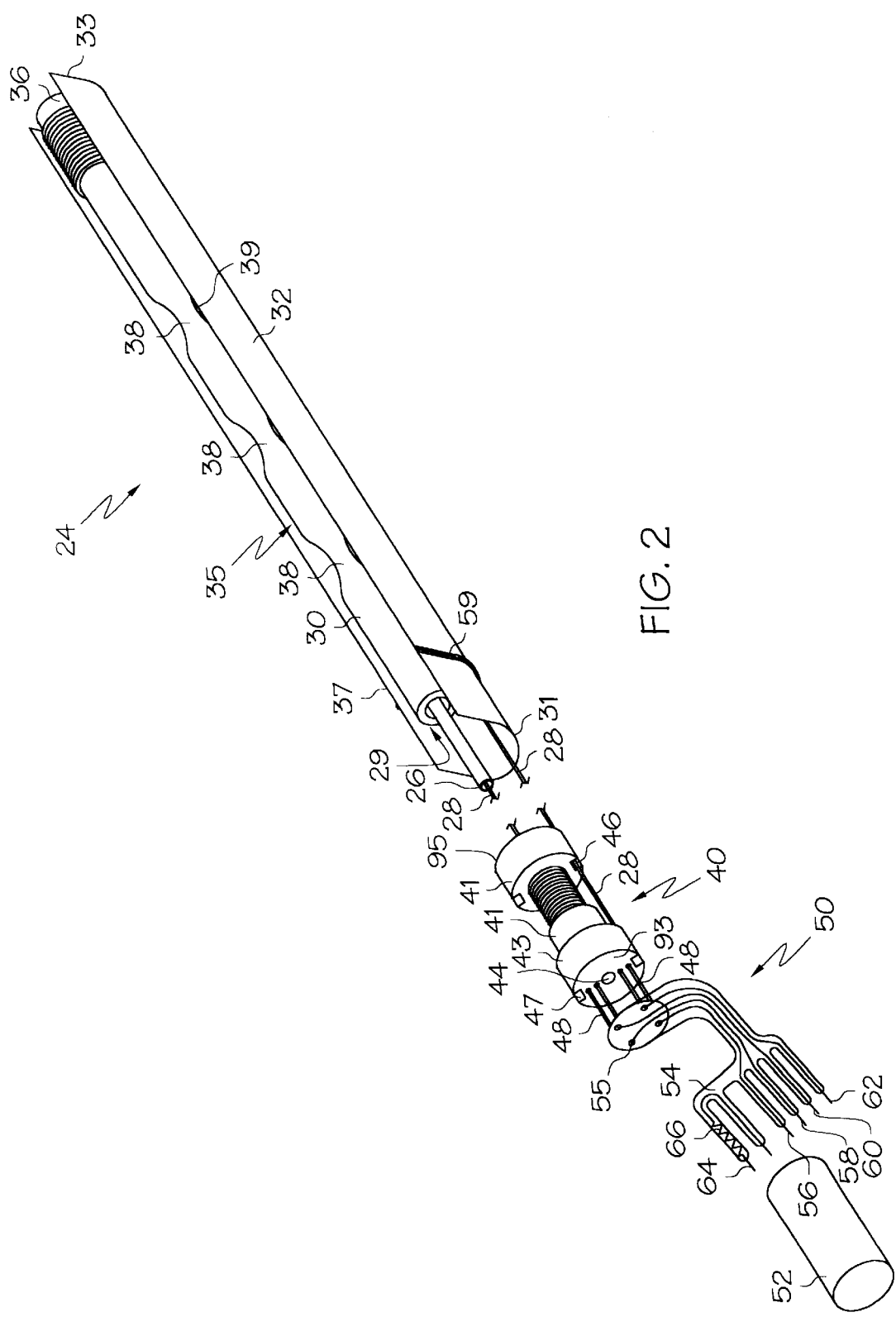
FIG. 2 is a partially exploded perspective view of a modular waveguide assembly made in accordance with the present invention, and for use in a sensor such as illustrated in FIG. 1.
Figure 3:
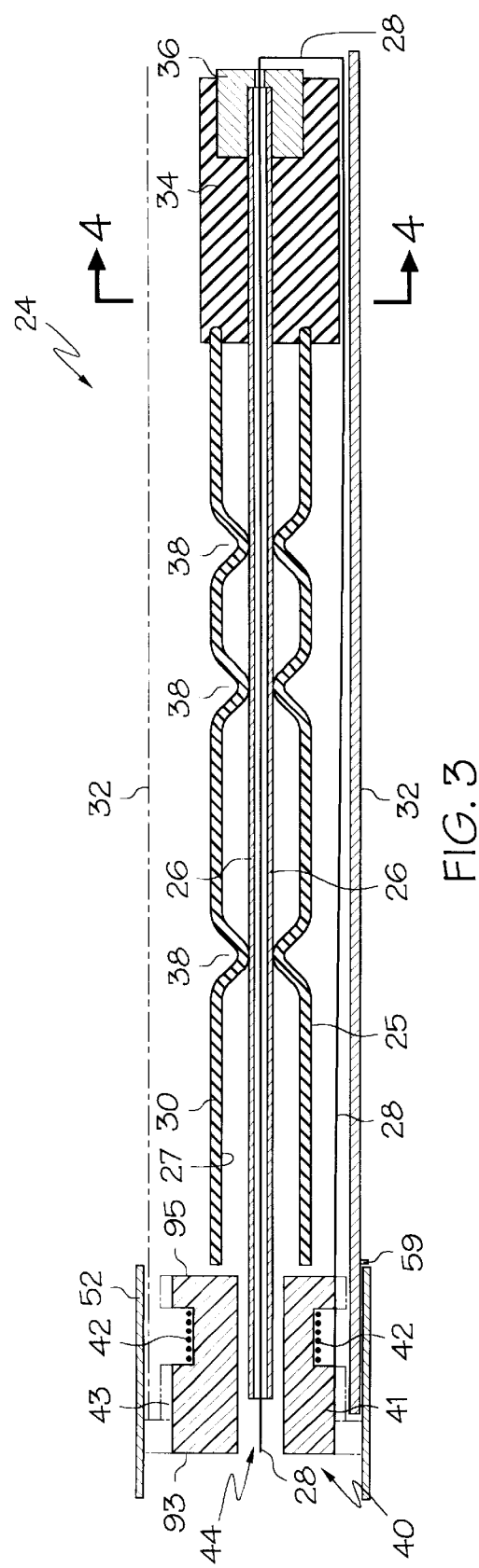
FIG. 3 is a longitudinal cross-sectional view of the modular waveguide assembly of FIG. 2, in assembled form.
Figure 6:
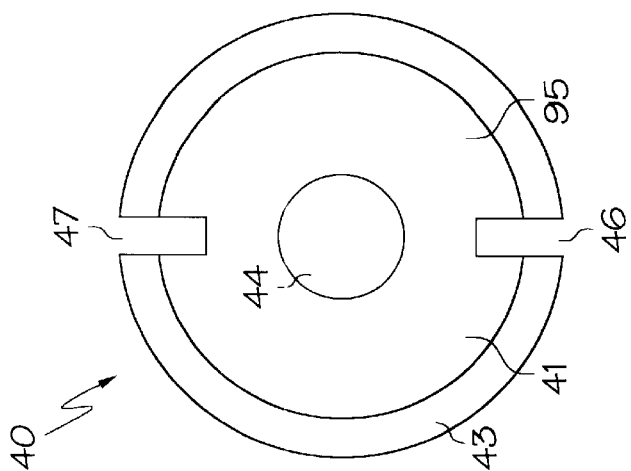
FIG. 6 is a bottom view showing the rear surface of the coil spool of FIG. 5.
Figure 4:
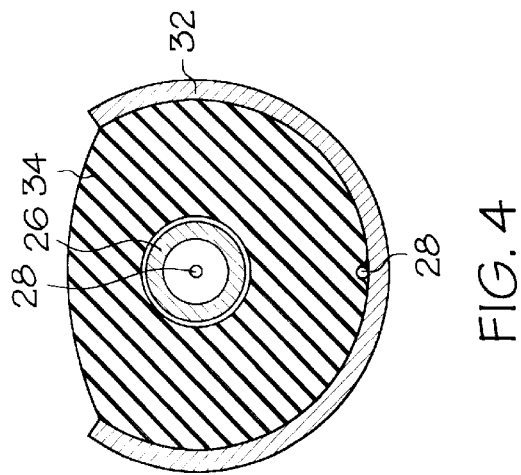
FIG. 4 is a cross-sectional view of the modular waveguide assembly of FIG. 3, taken along line 4—4.

FIG. 2, FIG. 3 and FIG. 4 depict a preferred embodiment of the modular waveguide assembly of the present invention. In assembled condition, the waveguide assembly resides within the waveguide housing 14 and flange 16 of the sensor 10 of FIG. 1, and connects to the electronics module contained within the electronics housing 12 shown in FIG. 1. FIG. 2 is a partially exploded side perspective view of the modular waveguide 24. The illustrated assembly 24 includes a hollow elongated magnetostrictive waveguide wire 26 (also referred to herein as the "waveguide") which carries the torsional wave created by the interaction of the magnet, the current pulse, and the magnetostrictive material used to form the waveguide wire 26. A conductive pulse wire 28 is strung through the center of the hollow waveguide 26 and returns outside of the waveguide. The pulse wire can comprise a solid conductive wire or a stranded conductive wire, and is used to carry the current pulse through the waveguide 26.

Alternatively, the waveguide 26 can comprise a solid wire of conductive magnetostrictive material so as to serve as the pulse conductor for the current pulse. In this alternative embodiment, a return wire is connected to the end of the waveguide for returning the current pulse back to its place of origin. Although a number of magnetostrictive or ferromagnetic materials may be used for the waveguide wire 26, it is preferred that the wire comprise a nickel iron (NiFe) material. As used herein the term "waveguide" refers to a length of material having the ability to deform in the presence of a magnetic field, such as, for example, a piece of ferromagnetic or magnetostrictive material.

To support, center, locate, and/or suspend the waveguide, a tubular support sleeve 30 is provided, as shown in FIG. 2 and FIG. 3. The sleeve 30 preferably comprises a hollow, integral piece of silicone rubber material having a number of crimped or deformed constrictions 38 formed along the length of the sleeve. As best shown in FIG. 3, the hollow waveguide 26, as well as the pulse conductor 28 contained therein, rest within the tubular support sleeve 30 and are protected from shock and vibration by the locating and supporting constrictions 38. Ideally, there is normally no contact between the support sleeve 30 and waveguide 26 at the constrictions 38 to reduce energy losses of the wave traveling along the waveguide 26. However, the space provided between the constrictions 38 and the waveguide 26 should also be de minimis to ensure maximum protection from shock. In other words, the support sleeve 30 and waveguide 26 are preferably made to be as close as possible in corresponding size without touching at the constrictions 38. However, in practice, light contact (as opposed to compressive forces) between the sleeve 30 and the waveguide 26 can be tolerated at the constrictions 38 without adverse affects. For example, the waveguide 26 could rest upon the sleeve 30 at the constrictions 38, and the contact between the waveguide and sleeve would be less than or equal to the weight of the waveguide wire.

The constrictions 38 are preferably formed in this support sleeve 30 during the manufacture of the sleeve, which can comprise an extrusion process. At each constriction 38, the inner surface 27 of the sleeve 30 comes closer to the waveguide than at other portions of the sleeve 30. To eliminate any possible resonance of a mechanical vibration (i.e., a mechanical standing wave) along the waveguide 26, the constrictions 38 are preferably placed at irregular intervals along the sleeve 30, as is shown in FIG. 2 and FIG. 3. In the preferred embodiment, the sleeve 30 comprises an integral piece of silicone rubber, as opposed to a plurality of pieces which fit together, to promote simple, efficient, and low cost manufacturing of the waveguide assembly 24. No rings need be provided and assembled within the sleeve 30 because the constrictions 38 serve the purpose of supporting and locating the waveguide. Other materials can be used to produce the sleeve 30 as well, such as a variety of rubber, composite or plastic materials.

All components of the modular waveguide assembly 24 rest within a hollow chamber 29 of the open support channel 32 shown in FIG. 2, FIG. 3, and FIG. 4. Preferably, this open channel 32 is made of a fiberglass material. However, it is contemplated that other materials suitable for use as a housing or support could be used as an alternative to fiberglass, such as, for example, plastic or metal. As best shown in FIG. 2, the support channel 32 is preferably entirely hollow and includes an opening 35 on its top which extends along its length and which is defined by a pair of edges 37 and 39. Accordingly, the channel 32 is preferably generally U shaped, and can have elements placed within it from either the open proximal end 31, the open distal end 33, or the opening 35 along the top. However, the channel 32 may take on other configurations, such as, for example, a rectangular shape, a "V" shape, or a "W" shape, without departing from the scope of the invention. Moreover, the proximal end 31 and distal end 33 and a portion of the opening 35 can be closed off without departing from the invention. In addition, a portion of the hollow chamber 29 within the channel 32 may be filled in solid. While the opening 35 of the channel preferably extends along substantially the entire length of the member to promote ease of manufacture, assembly, and uniformity, it should be understood that such opening need not be open along its entire length in all applications.

The waveguide support channel 32 provides a number of advantages. First, the channel 32 allows simple, repeatable, and efficient assembly of the various waveguide components. The manufacture of the assembly may be automated for several of these components because of the ease in which components can be placed into the channel 32. For example, the sleeve 30 can be easily pushed into the channel 32 by a machine in an automated process. In this regard, it is preferred that sleeve 30 include an effective outer diameter designed to snugly locate itself within the inner diameter of the channel, in order to assist in holding the assembled parts together. While it is not desirable to make the sleeve "oversized" with respect to the channel, the relative sizes should be determined to provide sufficient interference to establish an effective friction or a similar "snap" in fit which prevents inadvertent disassembly with expected handling and storage without compressing the sleeve significantly.

As will be appreciated, the channel 32 allows for all of the components of the waveguide assembly 24 to be secured into a stable unit which can be easily handled and transported, and, additionally, can be preassembled, tested, and stocked independently of the remaining components of the position sensor 10 of FIG. 1. Accordingly, when a customer places an order for a particular electronics module, electronics housing configuration 12, waveguide housing 14, and magnet assembly 18, the waveguide assembly 24 to be used with these customized components can already have been preassembled and ready for use within the channel 32. Thus, the waveguide assembly 24 can be quickly and easily inserted into the desired waveguide housing 14 and connected to the desired electronics module within the desired electronics housing 12. Also, the waveguide assembly 24 can be connected and used with any electronics module regardless of the length of the waveguide 26, as discussed in further detail below.

The channel 32 is preferably slightly bent, skewed, or curved along its length snugly such that it fits within the waveguide housing 14 by an interference fit between the channel 32 and the housing. It is contemplated that a variety of means for providing such a fit can be provided, such as by making the size of the channel to fit closely to the size of the interior of the housing 14 such that it fits snugly therein, or by providing an oversized portion on the channel to provide a snug fit with the housing. A slight curvature along at least a portion of the length of the channel can provide for a limited by effective interference or binding between the channel and housing 14. Depending upon the relative sizes of the channel and a housing, a bend of even a few thousandths of an inch along a length of 8–10 inches can be effective. An interference fit also reduces the need for additional mounting elements to be used to secure the waveguide assembly 24.

Figure 8:
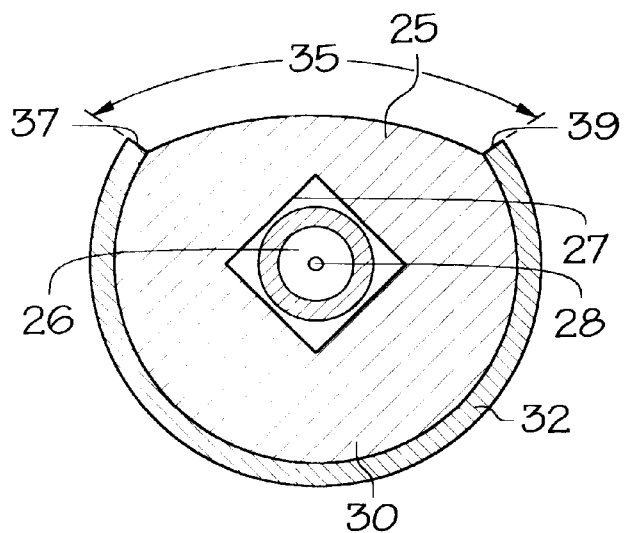
FIG. 8 and FIG. 9 are cross sectional views showing alternative embodiments of the waveguide assembly, according to the present invention.

FIG. 8 is a cross-sectional view of an alternative embodiment of the waveguide assembly taken along a constriction 38 of the support sleeve 30. As shown in this preferred embodiment, the sleeve 30 fits snugly within the channel 32. As can be appreciated, a snug fit allows for retention and preliminary alignment of the sleeve 30 during construction of the waveguide assembly. In this embodiment, the edges 37 and 39 curve inwardly and provide an opening 35 which is smaller than the width of the sleeve 30. Thus, when the sleeve 30 is pushed through the opening 35, it is slightly compressed. Once the sleeve 30 is moved through the opening 35, however, it expands to fit snugly within the inner chamber of the channel 32. To allow for such a fit, it is preferred that the sleeve 30 comprises a flexible, compressible, and elastic material, such as silicone rubber.

As is also shown in FIG. 8, the inner surface 27 of the sleeve 30 preferably forms a rectangular or diamond shape interior chamber rather than a circular shape as shown in the embodiment of FIG. 2. Accordingly, all portions of the inner surface 27 of this example are not equidistant from the waveguide 26 in this particular embodiment. However, the effective inner diameter of this constriction (the diameter of the largest circle that could fit within the opening defined by the inner surface 27 without touching the inner surface) is smaller at the constrictions 38 formed along the length of the sleeve 30, such as the constriction shown in the cross section of FIG. 8, than at other non-constricted portions of the length of the sleeve. While the inner surface at the constructions of sleeve 30 can take any shape (including circular), it is preferred that they be designed to minimize damping contact with the waveguide.

Figure 9:
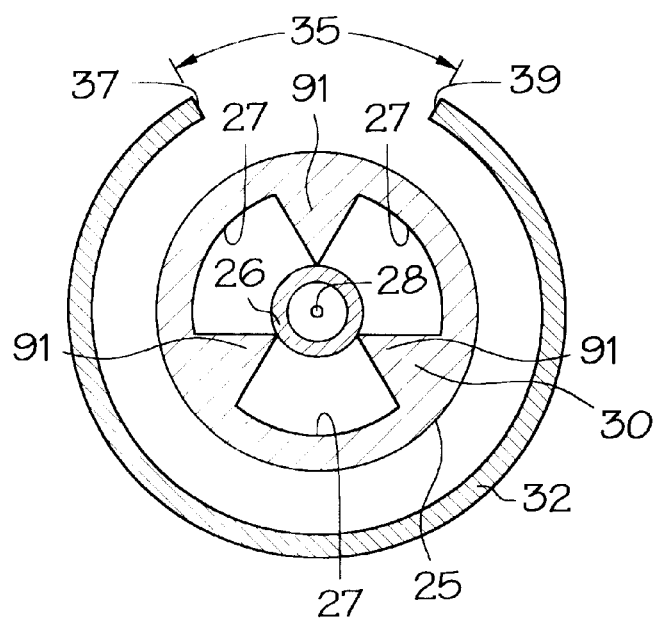

FIG. 9 is a cross sectional view of an alternative embodiment of a waveguide assembly of the present invention taken along a constriction of the support sleeve 30. As shown in this embodiment, the outer surface 25 of the sleeve 30 does not fit snugly against the channel 32. However, it is preferred that the outer diameter of the sleeve 30 be slightly larger than the opening 35 so that the sleeve does not easily fall out of the channel 32. The interior surface 27 of this sleeve 30 includes a number of protruding portions 91 which serve to support the waveguide 26. As noted above with respect to the embodiment of FIG. 2 and FIG. 3, it is preferred that these protruding portions 91 come as close to the waveguide 26 as possible without normally touching the waveguide. However, as mentioned, light contact (i.e., incidental contact without significant compression and/or damping effects) between the protruding portions and the waveguide 26 is possible without adverse effects. As shown by the embodiments of FIG. 8 and 9, the sleeve 30 may take on a variety of configurations without departing from the scope of the present invention.

Turning again to the embodiment of FIG. 2 and FIG. 3, a brass anchor 36 is preferably secured to the waveguide 26 such as by soldering or crimping. The weighted anchor prevents a wave, known as a longitudinal wave, from being generated at the remote end of the waveguide. Such a longitudinal wave can interfere with the operation of the magnetostrictive linear position sensor. The anchor 36 also helps to define the end of the damping zone and to secure the waveguide 26 within the channel 32. The pulse wire 28 can extend through the anchor 36 and back along the channel 32 between the mounting sleeve 30 and the channel. Materials other than brass can be used to construct the anchor 36, such as aluminum alloys.

As shown in FIG. 2, FIG. 3, and FIG. 4, a damping material 34 rests within the channel 32 and adheres to and surrounds the waveguide 26 so as to provide a damping function. Preferably, this material is initially at least partially flowable, and can comprise a silicone liquid which is caulked, poured, injected, or otherwise inserted into the channel 32 once the waveguide 26, pulse wire 28, and sleeve 30 have been placed into the channel 32. Because the waveguide 26 is longer than the mounting sleeve 30, it extends from the ends of the sleeve. Accordingly, once the sleeve 30 containing the waveguide 26 has been inserted into the channel 32 (with the pulse wire 28 being threaded through the proximal end of the waveguide 26 and returning back to the proximal end on the exterior of the sleeve 30), the damping material can be provided around the exposed portion of the waveguide 26 near the distal end 33 of the channel 32. The damping material 34 is poured between the end ring 36 and the distal end of the mounting sleeve 30, and partially overlaps the sleeve and end ring, as is best shown in FIG. 3. The damping material 34 can partially overlap the mounting sleeve 30 and end ring 36, in a random fashion such as might occur when applying a bead of caulking, in order to secure these elements within the channel 32. The material 34 helps to secure the sleeve and end ring into the channel 32.

After the damping material 34 has been provided around the waveguide 26 into the channel 32, the material is allowed to harden, solidify, and/or cure into a rubber-like material so as to provide the desired damping effect. To assist and speed the curing process, where heat curable damping material is utilized, the waveguide assembly 24 can be inserted into a heated oven for a predetermined amount of time. It is contemplated that a variety of at least initially flowable, partially flowable, liquid, or dough-like material which can provide a damping effect can be utilized as the damping material 34, in addition to the silicone rubber material described above. For example, a variety of plastics, waxes, and rubber materials could be used as the damping material 34. The material may be a liquid or semi-solid material which can be poured, injected, or caulked into the end of the channel 32 and which solidifies to provide a damping effect. Other curing processes may be alternately employed (e.g. radiation curing, etc.) where other damping materials are used. It is also contemplated that the material 34 could comprise a moldable material which can be pushed into the channel 32 and around the waveguide 26, and which eliminates the need for curing or solidification.

By adhering to and surrounding the waveguide 26, the damping material 34 helps hold the components in assembled condition and minimizes any reflection of the torsional wave at the end of the waveguide 26 as the wave travels along the waveguide in both directions from the location of the magnet. If desired, other damping elements, such as rings or sleeves, could be used in conjunction with the damping material 34 to custom "tune" the damping effect. Because the damping material 34 can be poured or injected into the channel, the application of the damping material is well suited for an automated process. Moreover, the observed damping characteristic of such a damping material 34 has been found to be more consistent, reliable, and predictable from assembly to assembly, in contrast to damping rings which generally have a greater degree of variance and reliability.

As best seen in FIGS. 2, 3 and 5–7, adjacent the proximal end of the channel is preferably mounted a support element having a base portion in the form of a spool 40 which includes a front surface 93 and a rear surface 95. The spool (or coil assembly) 40 includes a narrow portion 41 which is integrally connected to a cap portion 43 having a larger diameter than the narrow portion. The narrow portion includes a recessed portion about which a coil of wire 42 is wound, as is shown in FIG. 2 and FIG. 3. Through the center of the spool 40, running from the front surface 93 to the rear surface 95 is a bore 44 within which the waveguide 26 and enclosed pulse wire 28 are received loosely. Preferably, a sleeve (not shown) resides in the bore 44 and surrounds the end of the waveguide within the bore. The narrow portion 41 of the spool 40 can slide into the channel 32, and the inner end of the cap portion 43 will then abut the proximal end of the channel 32 and extend therefrom. However, it is contemplated that the spool may have a uniform diameter, thereby eliminating the cap portion, without departing from the scope of the invention.

The coil of wire 42 generates an electrical signal as the torsional strain wave in the waveguide 26 passes the coil. Thus, the coil 42 can be considered a type of mode converter. While one end of the pulse wire 28 is shown as resting in the bore 44 of the spool 40, the opposite end of the pulse wire 28 rests in an exterior groove 46 formed along the bottom of the spool 40.

Figure 5:
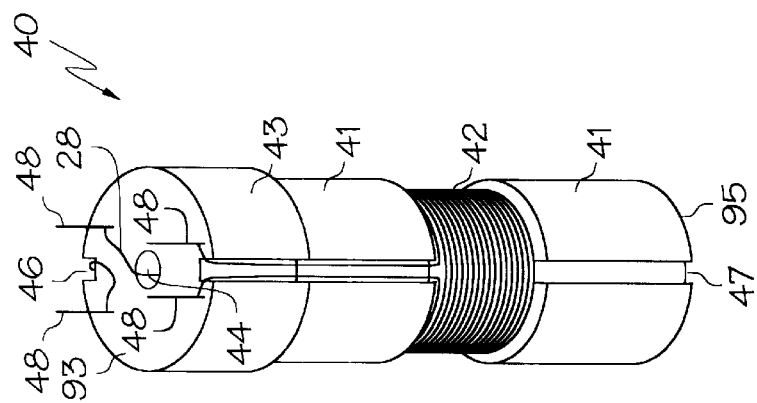
FIG. 5 is a perspective view of a coil spool in the vertical position, such as shown in FIG. 2 and FIG. 3, and made in accordance with the principles of the present invention.
Figure 7:
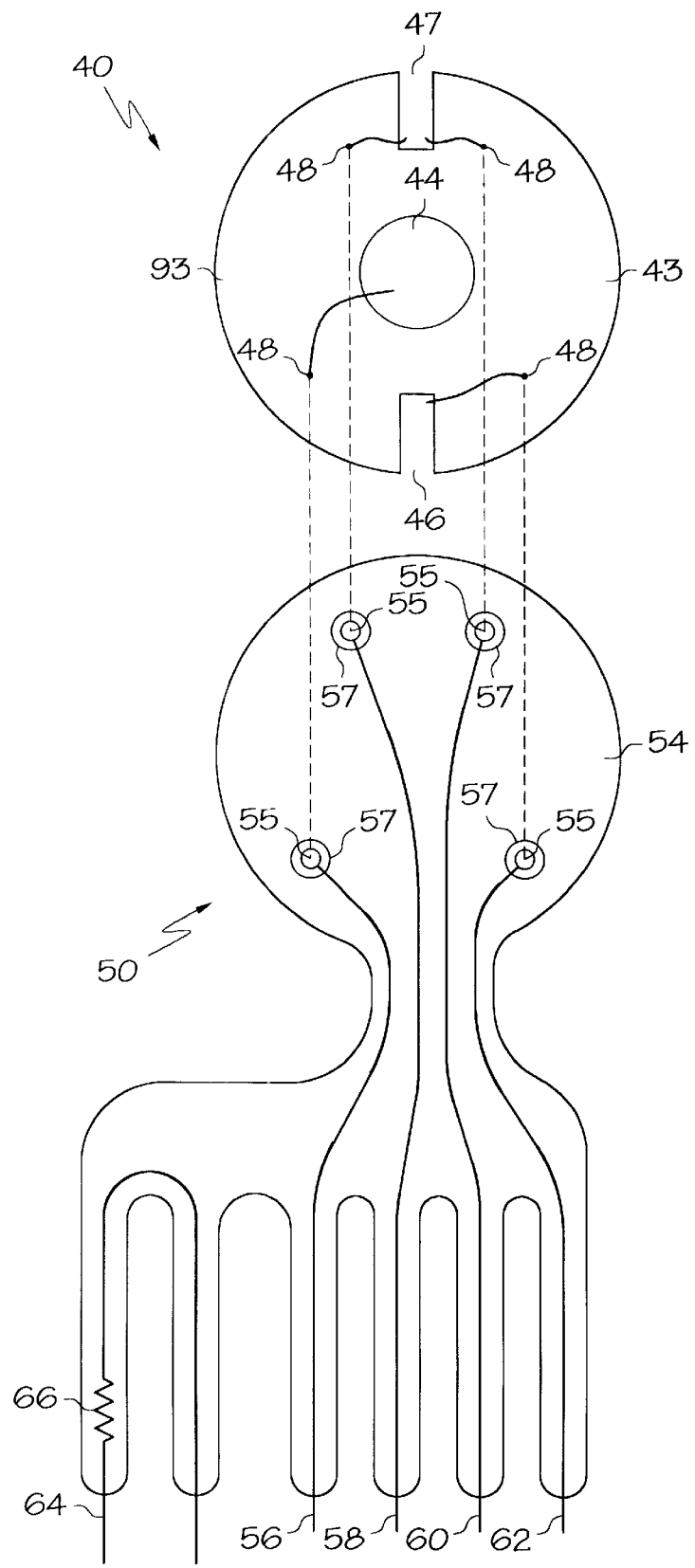
FIG. 7 is a top view showing the front surface of the coil spool of FIG. 5, showing its connection with a flexible cable connector having a waveguide calibration resistor, according to the principles of the present invention.

As best shown in FIG. 2, FIG. 5, and FIG. 7, the cap portion 43 of the spool 40 has four terminals, contacts, or connectors supported adjacent the front surface 93 thereof, shown in the form of pins 48. In a preferred arrangement, the pins can be partially embedded in the spool. Each pin 48 preferably comprises a ridged conductive metallic material for electrical connection with the electronics module. As shown in these figures, the two ends of the coil wire 42 run through a top groove 47 formed along the upper side of the spool 40 and each wire end is mechanically and electrically connected to a pin 48 formed on the cap portion 43 of the spool 40. Similarly, the pulse wire 28 extends through the bore 44 formed in the center of the spool 40 and is electrically and mechanically connected to a pin 48. The opposite end of the pulse wire 28 runs through the bottom groove 46 of at the lower end of the spool 40 and is electrically and mechanically connected to the remaining pin 48. Accordingly, these delicate wires are conveniently joined in one location for ease in connection and removal from an electronics module. These four wires can be soldered, crimped, or otherwise electrically connected to the pins 48.

It is contemplated that other spool configurations and arrangements could be utilized, such as rectangular and round arrangements for example, without departing from the scope of the present invention. It is also contemplated that the channels 46 and 47 and bore 44 of the spool 40 could be located and arranged differently without departing from the invention.

To further assist in the electrical connection of the waveguide assembly 24 with an electronics module, a flexible connector or harness 50 is provided for connection to the pins 48 of the spool 40. The flexible connector 50 includes a flexible plastic base portion 54 in which are embedded a number of wires 56, 58, 60, 62, and 64 which are exposed for electrical connection. At one end of the connector 50, the wires 56, 58, 60, 62, and 64 extend from the plastic base 54. At the opposite end, holes 55 are provided for connection to the pins 48 of the spool 40. Surrounding the holes 55 are islands 57 of electrically conductive material which are electrically connected to one of the wires 56, 58, 60, and 62. Accordingly, the pins 48 of the spool 40 can be fitted into the four holes 55 of the connector 50, and the islands can be soldered to the pins so as to provide the electrical connection between the wires 56–62 and the pins 48.

Accordingly, the wire 58 will be electrically connected to the pin 48 which is attached to one end of the coil 42. Similarly, the wire 60 will be electrically connected with the pin 48 which is attached to the opposite end of the coil 42. Furthermore, the wire 56 will connect with the pin 48 which is attached to the pulse wire extending through the bore 44 in the spool 40. Finally, the wire 62 connects with the pin 48 attached to the opposite end of the pulse wire 28. The connector 50 provides a simple and convenient plug-in connection for the electronics module that will be used with the waveguide assembly 24.

In addition, a wire 64 is looped through the base portion 54 of the flexible connector 50 such that both ends of the wire 64 are exposed on one end of the connector 50. Connected in series with this wire is a resistor 66, which can be selectively matched to the length of the magnetostrictive waveguide 26 with which the connector will be used. To be connected to this resistor is the amplifier circuitry (e.g. an operational amplifier) used in the electronics which processes the signal received by the coil 42. This resistor 66 aids in setting the gain of the amplifier so that the coil signal can be appropriately amplified to a range required by the electronics module which is later connected to the waveguide assembly 24. The resistor compensates for the magnetostrictive sensitivity of the waveguide selected, which is affected by the length of the waveguide and the properties of the materials of which it is comprised. The longer the magnetostrictive waveguide 26, the further the magnet assembly 18 will be allowed to be displaced from the coil 42, and the lower the amplitude of the torsional strain wave which propagates along the waveguide through the coil. Also, the properties of the material used for the waveguide, such as the hardness of the material for example, affects the strength of the signal which is generated. Consequently, a weaker torsional wave causes a weaker electrical signal to be generated in the coil 42. Accordingly, greater amplification is required for the weaker coil signals generated by longer waveguides, as well as by waveguides having less magnetostrictive sensitivity due to the properties of the materials used. Thus, during assembly of the waveguide assembly 24, the size of the resistor 66 (in ohms) is selected to appropriately correspond with the waveguide characteristics (e.g., waveguide length and material properties) so that the desired amplification of the coil signal can be obtained. The strength of the signal which will be generated by the particular waveguide selected, and thus its magnetostrictive sensitivity, can be determined by appropriate testing of the waveguide.

The ends of the wire 64 are then connected to the amplifier circuitry to set the gain of the amplifier. Accordingly, the resistor 66 represents the resistor (or one of the resistors) responsible for setting the gain of the amplification circuitry used with the electronics module to be connected to the waveguide assembly 24. Thus, waveguide assembly 24, once assembled with the appropriate resistor 66, is ready to be used and interchanged with any electronics module. The gain of the amplifiers used in the electronics module need not be adjusted or tuned once the waveguide assembly 24 is connected thereto, because the resistor 66 has already been appropriately matched or calibrated to the length of the waveguide 26 during the manufacture of the waveguide assembly 24. Accordingly, the waveguide assembly 24 is pre-calibrated by use of the resistor 66. The resistor 66 can be directly connected to the mounting member, such as channel 32, or can be "indirectly" connected, as in FIG. 2 where the resistor connects to the connector 50, the connector connects to the spool 40, and the spool resides in the channel 32. (As used herein, the term "connected" can mean directly connected or indirectly connected via other parts or elements.)

To further ensure that the level of the signal received from the coil 42 is at the appropriate level needed for processing, the electronics module connected to the waveguide assembly 24 preferably includes an automatic signal tuning device such as is described in U.S. application Ser. No. 08/730,755 the entire disclosure of which is hereby incorporated herein by reference. This automatic signal tuning device can ensure that the coil signal is further amplified to the appropriate level of amplification, as well as to ensure that any changes in the signal due to temperature, interference, and/or sensor components (such as the magnet used) can be compensated for accordingly.

A protective sleeve 52 can be fitted about the spool 40 and over the channel 32, as shown in FIG. 2 and FIG. 3. This sleeve 52 is illustrated as typically comprising a cylindrical piece made of a low-retentive material and shields the coil 42 from stray ambient magnetic fields which could interfere with the operation of the sensor. The sleeve 52 slides over the channel 32 until it reaches a stop surface 59 formed on and extending outwardly from the channel. The material used for the sleeve 52 is preferably optimized for low non-linearity and for maximum magnetic shielding of the coil 42. To secure the sleeve 52 to the interior of the flange 16, housing 14, and/or channel 32, an adhesive can be applied to the sleeve.

In operation, the electronics module (not shown) generates a current pulse, such as a 2 amp pulse for example, which is sent through the wire 56 and travels down the pulse wire 28 through the center of the waveguide 26. This pulse can be generated by a pulse generator and can be a periodic pulse of constant width, such as 4 to 5 microseconds. When the pulse reaches the magnet assembly 18 located about the waveguide 26, a mechanical wave is generated at the location of the magnet by means of magnetostriction (i.e., also known as the Joule effect).

The mechanical torsional wave generated in the waveguide 26 at the location of the magnet 18 travels away from the magnet in opposite directions along the waveguide. The torsional wave is also a carrier of magnetic information, and when it reaches the coil 42 wound on the spool 40, an electrical signal is generated in the coil by means of a phenomenon known as the Wiedemann effect. The electrical signal is in the form of a sine wave and is referred to as an ultrasonic signal because it propagation velocity lies in the ultrasonic range (e.g., about 2,850 meters per second The amplitude of the ultrasonic signal depends on the waveguide material, the length of the waveguide, the structure of the sensor, the temperature, and the position and magnetic field characteristics of the magnet assembly 18.

The signal is received at the ends of the coil 42 which are electrically connected to the wires 58 and 60 of the flexible connector 50. The wires 58 and 60 provide the signal to the electronics module. Preferably, two amplification stages are used within the electronics module to increase the gain of this signal for further processing. As noted above, the gain of one of the amplification stages can be determined by the size (in ohms) of the resistor 66, which has been matched to the length of the waveguide 26 used.

The time delay between the initiation of the current pulse through the pulse conductor 28 and the receipt of the electrical signal at the ends of the coil 42 represents the position of the magnetic element 18 along the waveguide 26. The electronics module connected to the waveguide assembly 24 measures the amount of time between the generation of these two signals and converts this time delay into a measured position, as is known in the art.

As the torsional strain wave also travels along the waveguide 26 toward the distal end of the waveguide, it reaches the damping material 34 which has been provided around the waveguide and solidified within the channel 32. This damping material 34 dampens the torsional wave so that reflection from the distal end of the waveguide is reduced. Also, as noted above, the end ring (or anchor) 36 prevents a longitudinal wave from being generated at this end of the waveguide.

FIG. 10 is a perspective view of an alternative embodiment of the support element according to the invention. In this embodiment, the spool 40 has rectangular sides and the coil 42 is wound about the middle of the spool. The ends of the coil extend along the top surface of the spool 40 and down the proximal end surface of the spool where they electrically connect to female terminals 84 and 86 connected to spool 40. A bore 44 is provided through the middle of the spool 42 for receiving one end of the waveguide 26 as well as one end of the pulse conductor 28 which preferably runs through the center of the waveguide. The conductor 28 extends through the bore 44 and emerges at the proximal end surface of the spool 42, where it connects with a female terminal 88 embedded in the spool. The opposite end of the conductor runs along the bottom surface of the spool 40 and connects with the female terminal 90. A resistor 66 is mounted adjacent to the proximal or rear end surface of the spool 40 and is electrically connected to the remaining female terminals 80 and 82. This resistor 66 is matched to the length of the waveguide to be used with the spool 40 in order to properly set the gain of an amplifier stage to be used with the electronics module in processing the electrical signal generated by the coil 42 by the movement of the waveguide 26, as described above. The matched resistor 66 can be mounted on the spool, embedded therein, or mounted to a wiring harness.

The spool of FIG. 10 allows for a simple and efficient "plug in" connection of the waveguide assembly to an electronics module having a compatible six pin male connector The pins which plug into female terminals 80 and 82 should connect to the amplifier circuitry so that the resistor 66 will set the gain of the amplifier circuitry. The pins which plug into terminals 84 and 86 should connect to the circuitry which receives the signal from the coil. In addition, the pins which plug into the female terminals 88 and 90 should connect to the circuitry which transmits the excitation current pulse through the pulse conductor 28. As an alternative to the female terminals shown, other connectors could be used with the spool 40 for connection with an electronics module without departing from the scope of the invention, such as the "plug in" connectors used for inserting microchips or circuit boards in a computer.

FIG. 11 is a perspective view of an alternative embodiment of the channel 32 of the present invention, adapted for use with the spool 40 of FIG. 10. The channel 32 includes an opening 35 extending along its length and partially defined by the edges 37 and 39 of the walls of the channel. Components of the waveguide assembly described above can be inserted in the channel 32 through this opening 35. The channel 32 includes a cover 74 which can serve to protect the spool 40 after it has been positioned and secured in the end of the channel. To close off the ends of the channel 32, a pair of end walls 72 and 76 are provided. However, the end wall 76 is preferably apertured to allow for connection of an electronics module to the waveguide assembly contained by the channel 32. In particular, the end wall 76 includes a number of access holes 78 which are configured to align with the female connectors 80–90 of the spool 40, thereby allowing for connection of the channel 32 to an electronics module having a male connector. Damping material can be injected through the opening 35 and around a waveguide which has been placed in the channel 32, such as described above.

The foregoing description of the preferred embodiments of the invention has been presented for purposes of illustration and description. It is not intended to be exhaustive or to limit the invention to the precise form disclosed, and modifications and variations are possible in light of the above teachings. For example, although a number of materials and shapes have been described for use in the preferred embodiments of the present invention, it is to be understood that other materials and shapes could be used as alternatives to those described without departing from the scope of the invention. Moreover, although a particular method of calculating the magnet position has been described, it is contemplated that other methods could be used in the alternative. For example, a method of calculating position by timing the receipt of a reflected torsional wave could be used, as could a method of calculating position based upon the strength of the coil signal. Thus, it should be understood that the embodiments were chosen and described in order to best illustrate the principals of the invention and its practical application to thereby enable one of ordinary skill in the art to best utilize the invention in various embodiments and with various modifications as are suited for the particular use contemplated. Accordingly, it is intended that the scope of the invention be defined by the claims appended hereto.

What is claimed is:

1. A position sensor comprising:
    a waveguide assembly comprising:
        a continuous elongated channel having an opening extending along at least a portion of its length;
        an elongated waveguide wherein a substantial length of the wave guide is located within the channel;
        a conductor located at least partially within the channel; and
        a mode converter connected to the channel and adapted to generate an electrical signal from a signal traveling along the waveguide;

a protective outer housing provided about the waveguide assembly;

a magnet mounted for movement along the protective outer housing, and;

an electronics module configured to receive an electrical signal from the waveguide assembly and provide an output representing the position of the magnet.

2. The waveguide assembly as recited in claim 1, further comprising:

a damping material located within the channel and in contact with a portion of the waveguide.

3. The waveguide assembly as recited in claim 2, wherein the damping material comprises an at least initially partially flowable material.

4. The waveguide assembly as recited in claim 3, wherein the damping material comprises a silicone material.

5. The waveguide assembly as recited in claim 1, further comprising:

a support sleeve located at least partially within the channel and surrounding at least a portion of the waveguide.

6. The waveguide assembly as recited in claim 5, wherein the support sleeve comprises a hollow elongated tube having an outer surface, an inner surface, and a plurality of constrictions spaced along the length of the tube, wherein the inner surface extends radially inwardly toward the center of the tube at each constriction to locate the waveguide.

7. The waveguide assembly as recited in claim 6, wherein the constrictions are spaced along the tube at irregular intervals.

8. The waveguide assembly as recited in claim 6, wherein the tube comprises an integral piece of silicone material.

9. The waveguide assembly as recited in claim 1, wherein the mode converter comprises a coil having a first end and a second end, the channel comprises a distal end and a proximal end, and the conductor comprises a first end and a second end, and wherein the waveguide assembly further comprises:

a support element at least partially received within the channel adjacent the proximal end of the channel, wherein the ends of the coil are secured at the support element, and wherein the first end of the conductor is secured at the support element.

10. The waveguide assembly as recited in claim 9, wherein the support element has a plurality of connection pins extending outwardly from the support element, a first pin of the connection pins is electrically connected to the first end of the coil, a second pin of the connection pins is electrically connected to the second end of the coil, and a third pin of the connection pins is electrically connected to the first end of the conductor.

11. The waveguide assembly as recited in claim 10, further comprising a connector having a first wire electrically connected to the first pin, a second wire electrically connected to the second pin, a third wire electrically connected to the third pin, wherein the first, second, and third wires of the connector each have an exposed end to facilitate convenient electrical connection with the electronics module.

12. The waveguide assembly as recited in claim 9, wherein the waveguide comprises a hollow tube, the conductor extends from the support element through the center of the tube and returns back to the support element outside of the tube, and both ends of the conductor are secured at the support element.

13. The waveguide assembly as recited in claim 9, wherein the waveguide comprises a proximal end and a distal end, the coil is wound around at least a portion of the support element, the proximal end of the waveguide is received within a bore in the support element, and the coil surrounds a portion of the waveguide.

14. The waveguide assembly as recited in claim 13, wherein the waveguide comprises a hollow tube, the conductor extends from the support element through the bore and the hollow tube and returns back to the support element outside of the tube, and wherein both ends of the conductor are secured at the support element.

15. The waveguide assembly as recited in claim 14, further comprising a protective sleeve enclosing the support element and coil.

16. The waveguide assembly as recited in claim 1, wherein the channel comprises a generally U shaped member.

17. The waveguide assembly as recited in claim 16, wherein the channel is sized to provide an effective interference fit with the protective outer housing, the opening is located adjacent the top of the channel and extends along substantially the entire length of the channel, and the channel includes at least one open end.

18. The waveguide assembly as recited in claim 1, further comprising a gain unit connected to the channel and having at least one terminal adapted to connect to the electronics module.

19. A waveguide assembly for use in a position sensor having a protective outer housing to surround the waveguide assembly, a magnet mounted for movement along the protective housing, and an electronics module which receives an electric signal from the waveguide assembly and provides an output representing the position of the magnet, the waveguide assembly comprising:

an elongated channel having an opening extending along at least a portion of its length;

an elongated waveguide located at least partially within the channel;

a conductor located at least partially within the channel;

a mode converter connected to the channel and adapted to generate an electrical signal from a signal traveling along the waveguide; and a support sleeve located at least partially within the channel and surrounding at least a portion of the waveguide.

20. The waveguide assembly as recited in claim 19, wherein the support sleeve comprises a hollow elongated tube having an outer surface, an inner surface, and a plurality of constrictions spaced along the length of the tube, wherein the inner surface extends radially inwardly toward the center of the tube at each constriction to locate the waveguide.

21. The waveguide assembly as recited in claim 20, wherein the constrictions are spaced along the tube at irregular intervals.

22. The waveguide assembly as recited in claim 20, wherein the tube comprises an integral piece of silicone material.

23. A waveguide assembly for use in a position sensor having a protective outer housing to surround the waveguide assembly, a magnet mounted for movement along the protective housing, and an electronics module which receives an electric signal from the waveguide assembly and provides an output representing the position of the magnet, the waveguide assembly comprising:

an elongated channel having an opening extending along at least a portion of its length;

an elongated waveguide located at least partially within the channel;

a conductor located at least partially within the channel;

a mode converter connected to the channel and adapted to generate an electrical signal from a signal traveling along the waveguide; and wherein the mode converter comprises a coil having a first end and a second end, the channel comprises a distal end and a proximal end, and the conductor comprises a first end and second end, and wherein the waveguide assembly further comprises:

a support element at least partially received within the channel adjacent the proximal end of the channel, wherein the ends of the coil are secured at the support element, and wherein the first end of the conductor is secured at the support element.

24. The waveguide assembly as recited in claim 23, wherein the support element comprises a plurality of connection pins extending outwardly from the support element, wherein a first pin of the connection pins is electrically connected to the first end of the coil, a second pin of the connection pins is electrically connected to the second end of the coil, and a third pin of the connection pins is electrically connected to the first end of the conductor.

25. The waveguide assembly as recited in claim 24, further comprising a connector having a first wire electrically connected to the first pin, a second wire electrically connected to the second pin, a third wire electrically connected to the third pin, wherein the first, second, and third wires of the connector each have an exposed end to facilitate convenient electrical connection with the electronics module.

26. The waveguide assembly as recited in claim 23, wherein the waveguide comprises a hollow tube, the conductor extends from the support element through the center of the tube and returns back to the support element outside of the tube, and both ends of the conductor are secured at the support element.

27. The waveguide assembly as recited in claim 23, wherein the waveguide comprises a proximal end and a distal end, the coil is wound around at least a portion of the support element, the proximal end of the waveguide is received within a bore in the support element, and the coil surrounds a portion of the waveguide.

28. The waveguide assembly as recited in claim 27, wherein the waveguide comprises a hollow tube, the conductor extends from the support element through the bore and the hollow tube and returns back to the support element outside of the tube, and wherein both ends of the conductor are secured at the support element.

29. The waveguide assembly as recited in claim 28, further comprising a protective sleeve enclosing the support element and coil.

* * * * *